P. C. PHILIP.
HAY DISTRIBUTOR.
APPLICATION FILED MAY 14, 1921.
1,407,571.
Patented Feb. 21, 1922.
2 SHEETS—SHEET 1.
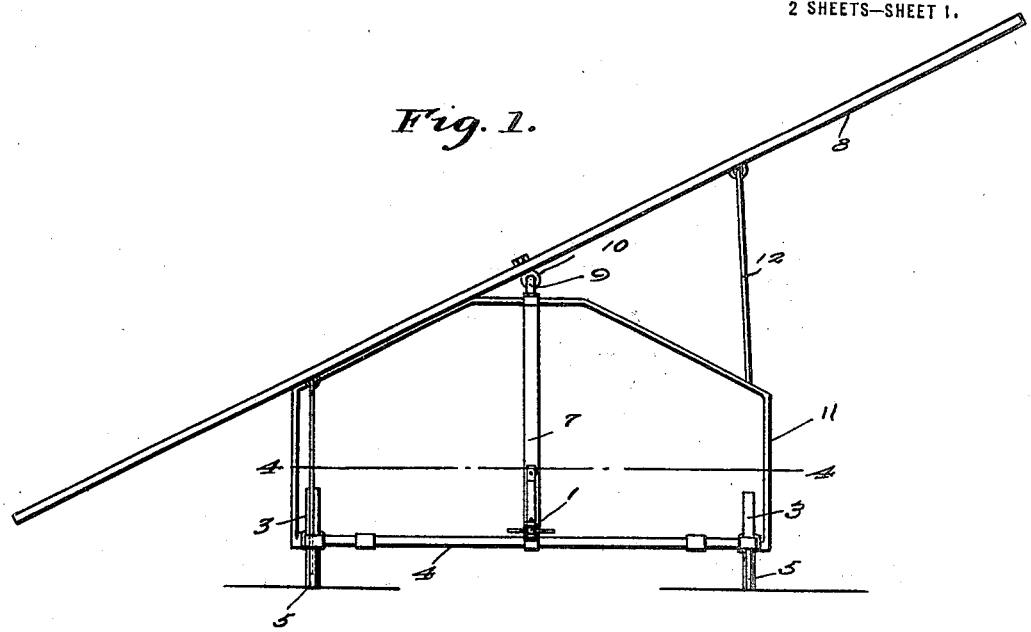
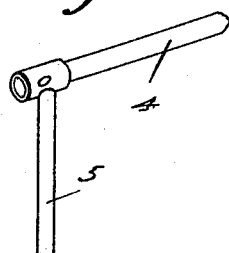
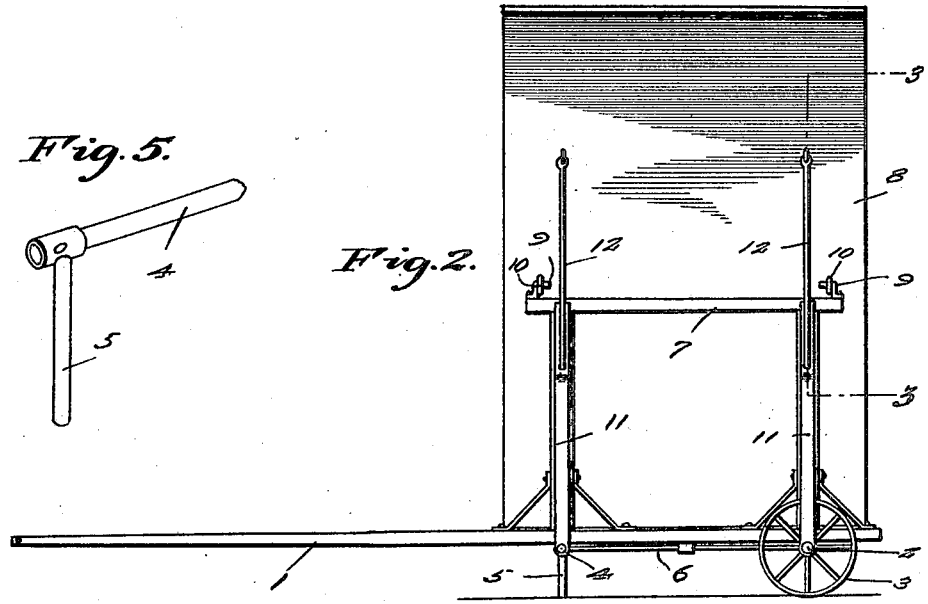
P. C. Philip INVENTOR
BY Victor J. Evans ATTORNEY
WITNESSES
R. O. Thomas P. C. PHILIP.
HAY DISTRIBUTOR.
APPLICATION FILED MAY 14, 1921.
1,407,571.
Patented Feb. 21, 1922.
2 SHEETS—SHEET 2
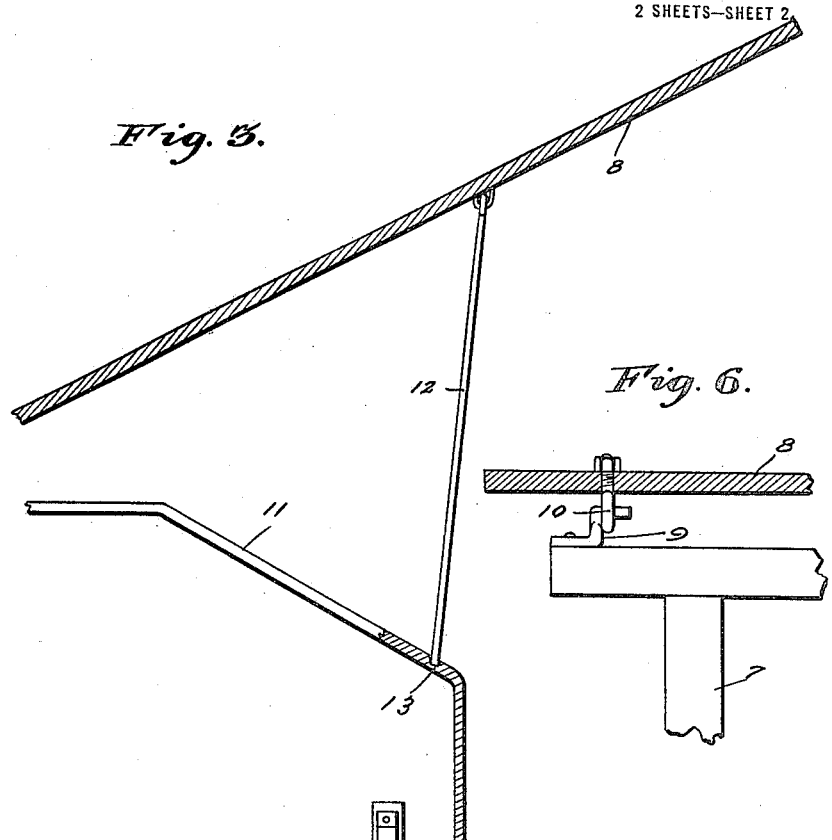
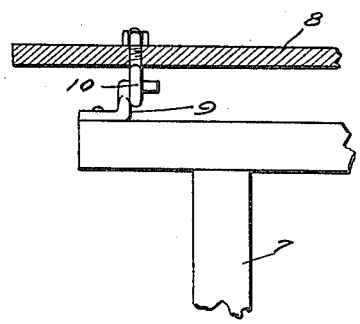
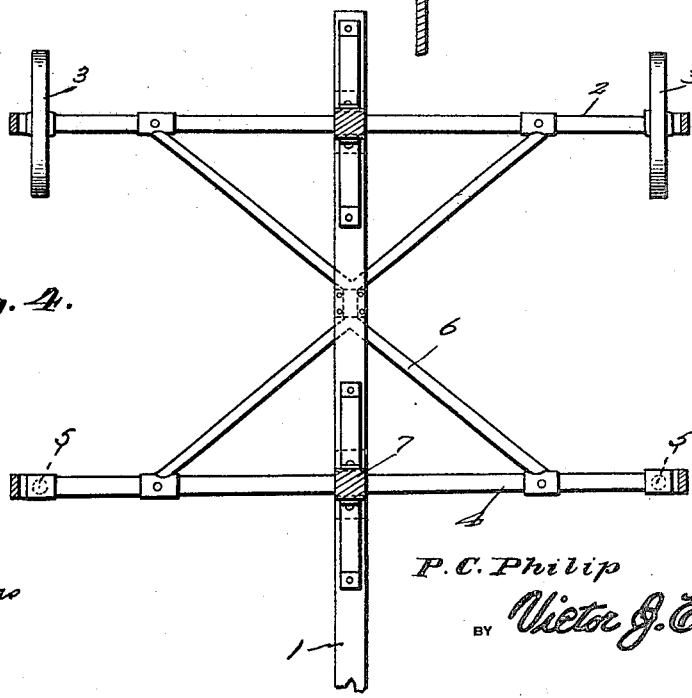
P. C. Philip, INVENTOR
BY Victor J. Evans
ATTORNEY
R. O. Thomas
WITNESSES

UNITED STATES PATENT OFFICE.

PETER C. PHILIP, OF BOWLUS, MINNESOTA.

HAY DISTRIBUTOR.

1,407,571. Specification of Letters Patent. Patented Feb. 21, 1922.

Application filed May 14, 1921. Serial No. 469,407.

*To all whom it may concern:*

Be it known that I, PETER C. PHILIP, a citizen of the United States, residing at Bowlus, in the county of Morrison and State of Minnesota, have invented new and useful Improvements in Hay Distributors, of which the following is a specification.

This invention relates to a truck for distributing hay and the like in barns, the principal object of the invention being to provide means for receiving the hay from the carrier and directing it to one side or the other of the track of the carrier.

Another object of the invention is to provide the device with a tiltable platform with means for holding the platform tilted towards the right or left to deposit the hay to one side or the other of the track.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Figure 2 is an end view.

Figure 3 is a longitudinal sectional view on line 3—3 of Figure 2.

Figure 4 is a cross sectional view on line 4—4 of Figure 1.

Figure 5 is a detail view showing one end of the front axle and the leg thereon.

Figure 6 is a detail view partly in section showing one set of hinging means and the platform.

As shown in these views the device comprises a tongue 1, the rear axle 2 to which the wheels 3 are secured, the front axle 4 to which the legs 5 are secured and the braces 6 for connecting the front and rear axles to the tongue. The upright frame 7 is longitudinally arranged on the tongue, at the rear thereof, and a platform 8 has its central part pivotally secured to the top cross piece of said frame so that it can be rocked on said cross piece. I prefer to connect the table with the cross piece by the hooks 9 and the eye bolts 10. A pair of arms 11 is secured to each side of the upright frame at the top thereof, the lower ends of one arm of each pair being connected with the rear axle and the lower end of the other arm being connected with the front axle. Each arm has its upper half extending at an incline upwardly to the cross piece of the upright frame. These inclined parts form rests for the platform or table when the same is tilted.

The means for holding the platform in tilted position comprises the bars 12 swung from the platform adjacent the corners thereof and having their lower ends bent to engage holes 13 in the arms 11 located at a point adjacent the junction of the inclined part with the vertical part of each arm. The rods 12 at the high end of the platform have their bent ends placed in said holes to hold the platform in tilted position, the rods in the lower end of the platform hanging free.

It will be seen that the device can be easily moved forwardly or rearwardly by grasping the tongue and slightly lifting the same to lift the legs off the floor and then rolling the device on its rear wheels.

The device is placed in a barn or the like under the track of the carrier so that its platform will receive the hay discharged from the carrier. This hay falling upon the inclined platform will be directed to the side of the barn at one side of the track and when this side is filled the platform is tilted in the opposite direction to deposit the hay at the other side of the track. The device is then pulled forward to fill a new section of the barn. My device reduces the manual handling of the hay to a minimum as it is not necessary for the hay to be carried on forks from the center of the barn to the sides thereof.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a wheeled frame, an upright frame thereon extending longitudinally thereof, a table having its center tiltably connected with the top of the upright frame, rests on the wheeled frame for supporting the table in tilted position and means for holding the table in tilted position.

2. A device of the class described comprising a tongue, front and rear axles carried by the tongue, legs on the front axle, wheels on the rear axle, an upright frame on the tongue, a table tiltably secured to the upper end of the frame and means for holding the table in tilted position.

It testimony whereof, I affix my signature.

PETER C. PHILIP.